United States Patent [19]

Weisenburger

[11] 3,732,529

[45] May 8, 1973

[54] INTEGRATED CIRCUIT SOCKET

[75] Inventor: Lawrence P. Weisenburger, Ottsville, Pa.

[73] Assignee: Aries Electronics Inc., Frenchtown, N.J.

[22] Filed: Dec. 22, 1970

[21] Appl. No.: 100,743

[52] U.S. Cl. ........339/192 R, 339/17 CF, 339/210 M, 339/221 M, 339/258 P

[51] Int. Cl. ..........................H01r 23/02, H01r 13/12

[58] Field of Search .........................339/17 L, 17 LC, 339/17 LM, 17 C, 17 CF, 176 M, 176 MF, 176 MP, 191 M, 192, 193, 206, 207, 210, 221, 258

[56] References Cited

UNITED STATES PATENTS

| | | | |
|---|---|---|---|
| 3,543,220 | 11/1970 | Jones | 339/193 VS |
| 3,395,377 | 7/1968 | Straus | 339/17 L |
| 2,965,872 | 12/1960 | Linn | 339/258 P |
| 3,336,565 | 8/1967 | Crimmins | 339/107 |
| 3,070,769 | 12/1969 | Murphy | 339/192 R |
| 3,487,350 | 12/1969 | Hammell | 339/17 C |
| 3,340,439 | 9/1967 | Henschen et al. | 339/17 CF |
| 3,516,044 | 6/1970 | Barnes et al. | 339/193 VS |
| 3,621,444 | 11/1971 | Stein | 339/210 M X |
| 3,495,131 | 2/1970 | Melcher | 339/17 CF |
| 3,517,376 | 6/1970 | Sarazen et al. | 339/192 R |
| 3,538,491 | 11/1970 | Longenecker et al. | 339/256 R |

FOREIGN PATENTS OR APPLICATIONS

| | | | |
|---|---|---|---|
| 1,263,085 | 4/1961 | France | 339/258 RR |

OTHER PUBLICATIONS

IBM TECHNICAL DISCLOSURE, Vol. 11, No. 10, March 1969, "Self-Locking Socket" by T. Kehagioglou.

*Primary Examiner*—Marvin A. Champion
*Assistant Examiner*—Lawrence J. Staab
*Attorney*—Thomas M. Marshall

[57] ABSTRACT

A socket assembly for receiving electronic components and comprised of a base having channels therethrough receiving a terminal comprised of an upper receptacle and a terminal post extending through the channels and from beneath the base, and of an upper housing mating with the base and including channels receiving the receptacles of the electrical terminals and terminating in openings at the top of the housing for accepting the pins of the electronic component. The housing is removable for the easy replacement of the terminals and is held in place by laterally deflectable interior arms on the base having hook portions engaging a shoulder in the housing.

15 Claims, 10 Drawing Figures

INVENTOR.
LAWRENCE P. WEISENBERGER
BY
Thomas McMarshall
ATTORNEY

INVENTOR.
LAWRENCE P. WEISENBERGER

BY

Thomas M Marshall

ATTORNEY

INTEGRATED CIRCUIT SOCKET

BACKGROUND OF THE INVENTION

This invention relates to sockets for receiving electrical connections and, more particularly, to a socket offering maximum support of electrical terminals that may be easily removed by disassembling the socket.

Miniaturized circuits have been in use for some time and are employed on an ever-increasing scale in complex electronic equipment. The practices in the technology have evolved such that it is now common practice to use what have become known as integrated circuits, or physically small units containing an entire circuit (rather than a single electric element), and to mount these integrated circuit packs or units to printed circuit boards and the like. It was early practice to solder the electrical contacts or terminals of these integrated circuits directly to points on the integrated circuit board. In other cases, the electronic circuit packs were mounted directly to a dielectric board with terminals extending through the board for connection to conductors.

Through a gradual evolutionary use of these techniques, it is now more common and desirable to mount electronic integrated circuit units to a terminal board or printed circuit board for easy removal and exchanging of individual units. Accordingly, sockets are now often provided for receiving the pins (contacts) of the integrated circuit pack. These sockets generally include a dielectric housing supporting electrical contacts for receiving the pins of the integrated circuit, the contacts having long pins, or posts, extending from the lower part of the housing for insertion through holes in the printed circuit board. When the socket is mounted in place on the circuit board, the terminal posts extend to the back side of the printed circuit board, providing terminal posts for receiving a wrapped wire or other common type of conductor connection for joining the integrated circuit to other components on the same or other circuit boards.

These are several attributes considered desirable in a socket of this type, including ease of replacement of the terminals in the event of inadvertent damage during wiring but without removing the socket from the printed circuit board, the accuracy of terminal post alignment during the affixation of the socket to the printed circuit board, terminal density (i.e., the number of terminals or contacts per unit area), ease of assembly of the socket during manufacture, and restricted entry of pins into the socket openings (i.e., a socket opening which is smaller than the contact but which just accepts the correct size of contact from the integrated circuit). It is an object of the present invention to provide all of these attributes in a single socket and, to this end, to overcome the failure of the prior art devices to satisfy one or more of these requirements.

SUMMARY OF THE INVENTION

In general, these and other objects of the invention are met by a socket having a base provided with channels for receiving electrical terminals that include a receptacle portion extending above the base and a connection portion (e.g.,. a terminal post) extending from the undersurface of the base, the socket also having an upper housing that mates with the base and has channels receiving and providing lateral support for the receptacle portion of the terminal. The channels in the upper housing terminate at an upper surface to provide socket openings communicating with the terminal receptacle.

In preferred embodiments of the invention, the upper housing member is readily removable from the base by squeezing together latching arms extending upwardly from each end of the base and engaging shoulder portions on the upper housing. When the latching arms are moved together, they disengage the shoulder, permitting the upper housing to be lifted upwardly away from the base. This permits easy access to and removal of any damaged terminals.

BRIEF DESCRIPTION OF THE DRAWINGS

For a better understanding of the invention, together with the further objects and advantages thereof, the following detailed description of preferred embodiments and the drawings may be referred to, in which.

DESCRIPTION OF PREFERRED EMBODIMENTS

Figures 1, 2:
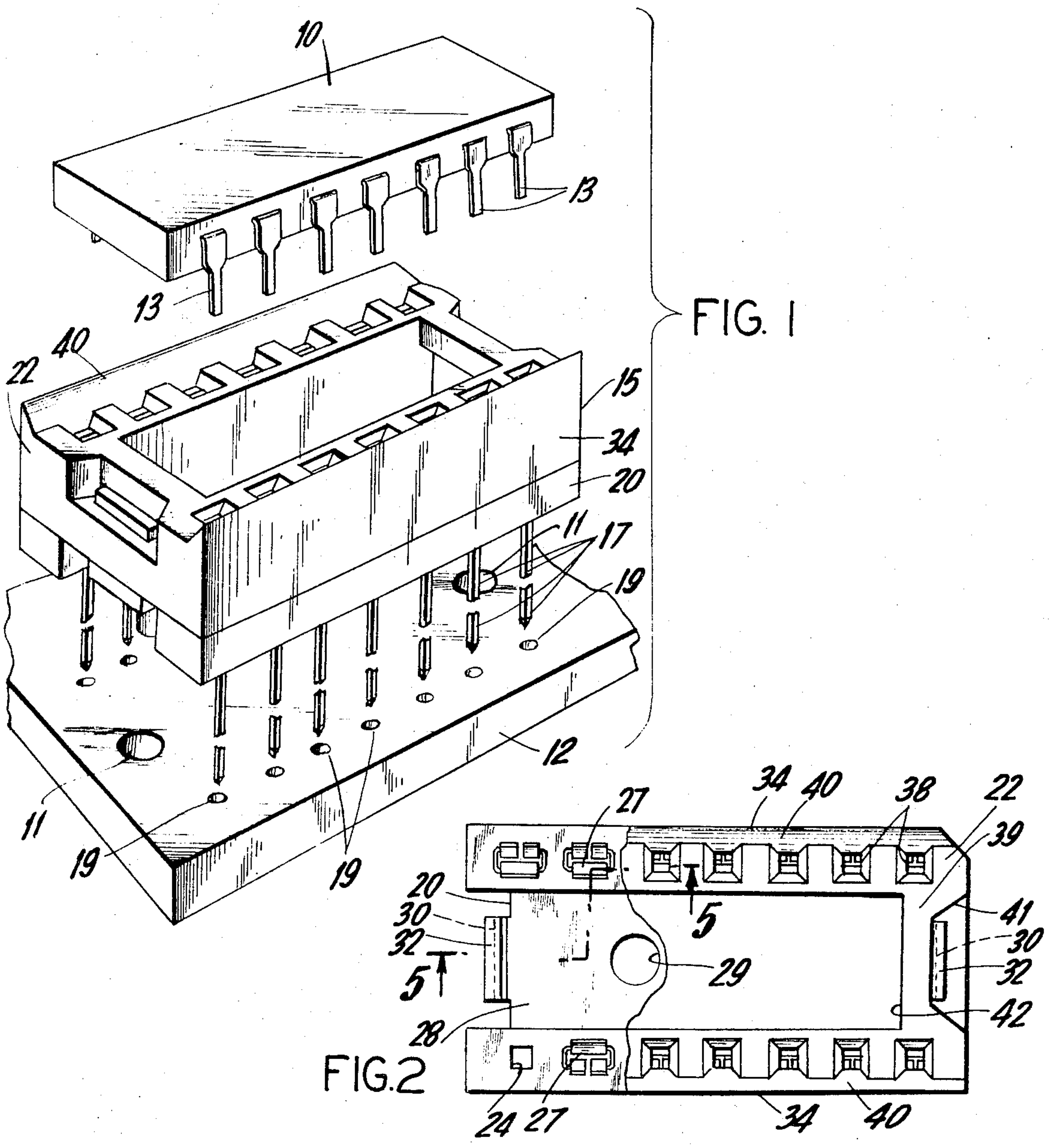
FIG. 1 is an exploded perspective view of a socket according to the invention, together with a representative integrated circuit and printed circuit board of types with which the invention may be used.
FIG. 2 is a cut-away plan view of a socket according to the invention.

FIG. 1 illustrates the manner in which electronic integrated circuit components, such as the small rectangular unit 10 illustrated in FIG. 1, are mounted to a printed circuit board 12. The pins 13 of the integrated circuit pack are fitted into receptacles in an intermediate socket 15 having electrical terminals in the form of terminal posts 17 extending from the socket underside. With the socket in place, the posts 17 extend through uniformly spaced holes 19 in the board and protrude from the underside of the printed circuit board in order to provide terminal connections for conductors and the like. In this manner, all conductor wiring (printed or otherwise) is made at the underside of the terminal board. The socket 15 shown in FIG. 1, which is the subject of the invention, will now be described in more detail.

Figure 3:
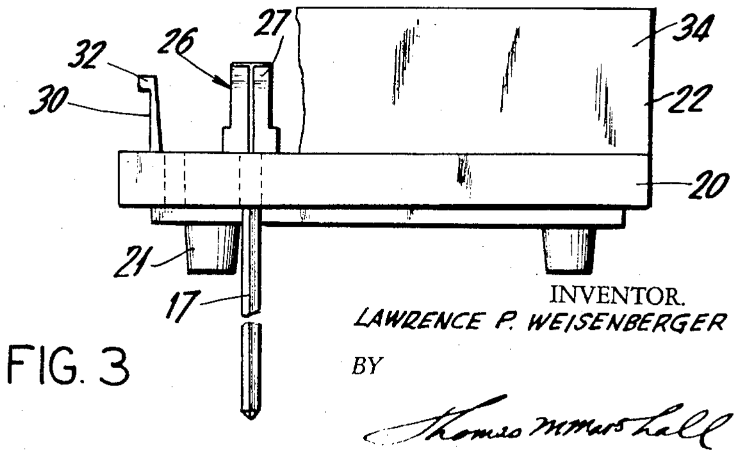
FIG. 3 is a cut-away side elevation of the socket of FIG. 2.

The cut-away views of FIGS. 2 and 3 illustrate the relationship among the various parts of the socket 15. As illustrated there, the socket includes a base member 20 and a mating upper housing 22. This socket is of the dual in-line type, in which the terminal connectors of the socket are evenly spaced in two parallel rows. The base 20 includes a series of spaced, small square apertures 24 along edge portions of the base for receiving the terminal posts 17 of the electrical terminals 26. These terminals, or contacts, fit into the holes 24 to leave the terminal receptacles 27 extending upwardly from the upper surface of the base. When the socket is in place, the posts 17 protrude through the holes 19 in the circuit board. A recessed central portion 28 of the base has one or more apertures 29 for receiving screws or other fasteners that secure the base to the printed circuit board. Projecting upwardly from the ends of the base, and preferably being integral therewith, are a pair of laterally resilient latching arms 30 having at their free ends a hook or latch portion 32. This latch portion 32 engages a shoulder on the upper housing 22 when the housing is snapped in place, as will be explained shortly.

Depending from base 20 are a pair of tapered studs 21 which are adapted to cooperate with precisely located holes 11 extending through printed circuit board 12. These studs provide a positive location of the intermediate socket 15, and hence, allows holes 19 to be slightly oversized, without affecting the operation of the assembly.

The upper housing 22 is formed generally as a rectangular wall having an open center and long sides 34 containing apertures 36 (see FIG. 5) which terminate in openings 38 at the top surface 39 of the housing. The openings 38 have downwardly and inwardly tapering surfaces 38*a* which guide the individual pins of the integrated circuit into the openings for accurate placement into the receptacles 27 of the contacts. Additionally, each of the walls 34 is provided with an inwardly and downwardly tapered surface 40 for gently guiding the flexible pins 13 of the integrated circuit pack into the tapered openings 38.

Figure 4:
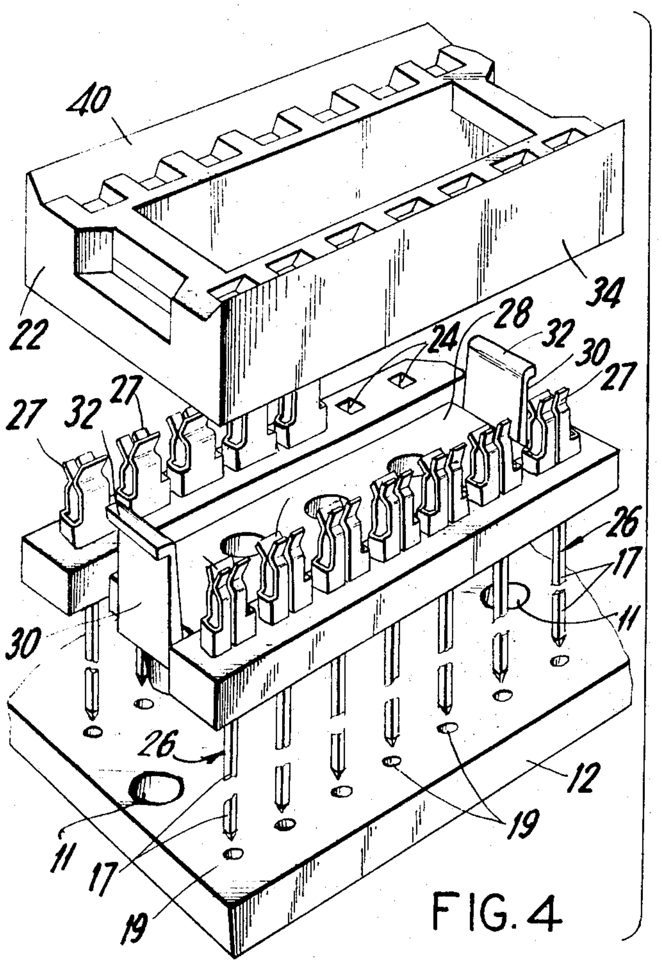
FIG. 4 is an exploded perspective view of the socket shown in FIG. 1, with the upper housing removed from the base.
Figure 5:
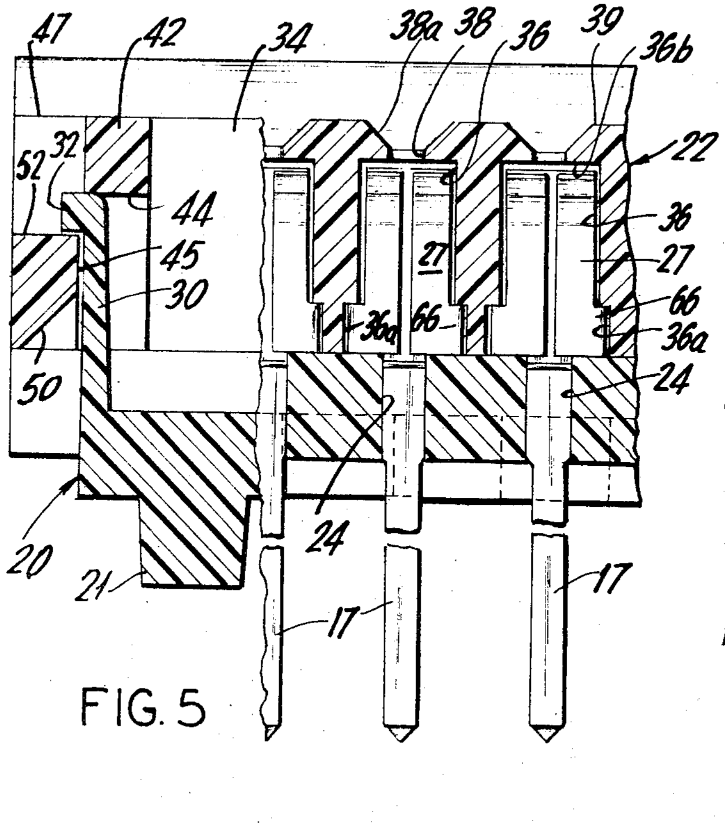
FIG. 5 is an elevational view in cross-section, taken along the lines 5—5 in FIG. 3.

Referring to FIGS. 4 and 5, the ends 42 of the rectangular housing have laterally extending slots, or recesses, formed at the intersection of the interior surface 45 and an inwardly tapered recess 47 in the outer surface of the ends.

The method of assembly of the socket according to the invention is best illustrated in FIG. 4. First, the individual electrical contacts 26 are inserted into the apertures or channels 24 through the unitary base member 20, with the terminal posts 17 extending from the underside of the base and the receptacle portions 27 extending at least partially upwardly from the upper surface of the base. In FIG. 4, most of the channels 24 shown are already provided with the electrical terminals, which slide easily into and out of the channels. When the upper housing 22 is not in place, as is shown in FIG. 4, the electric terminals 26 may be removed merely by lifting them out of the channels 24. Following the insertion of the terminals 26, the mating upper housing section 22 is placed in registration over the base 20.

Reference to FIG. 5 shows the manner in which the latching arms 30 operate. As the housing section 22 is moved over the base, the hooks portions 32 of the arms engage an inwardly and upwardly tapered undersurface 50 in the end walls 42 of the housing. This urges the arms 30, which are resilient, inwardly toward each other as shown in phantom lines and, as the housing 22 is then moved into its final position against the base 20, the hook portions 32 are released for limited outward movement where the hook portions 32 are released for limited outward movement where the hook portions 32 engage the shoulders 52 formed in the ends by the recesses 44, as illustrated by the said lines. They then prevent the cover from being dislodged. It is readily observed that the upper housing 22 is easily removed merely by urging the two arms 30 inwardly so that the hook portions 32 clear the shoulder 52, after which the housing 22 may be lifted off for replacement of any of the terminals 26. Since the arms 30 are at the inside of the housing 22, they do not dimensionally increase the socket and are protected against damage.

Figures 6, 8:
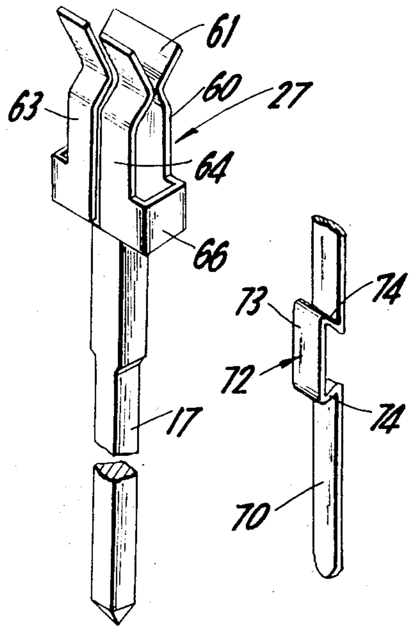
FIG. 6 is a perspective view of a terminal according to the invention and embodied in the sockets illustrated in FIGS. 1–5.
FIG. 8 is a perspective view of the terminal post portion of the terminal according to the invention, showing a modification thereof.

Turning now to FIG. 6, a novel terminal is shown which is advantageously adapted to the socket shown in the previous figures. The terminal as already noted, has a lower terminal post 17 and a receptacle 27. The post 17 may be a U-shaped channel or, as in the case shown, a solid conductive member. The upper portion of the post 17 terminates in the receptacle 27, which is composed of relatively thin conductive metal formed in the shape shown from a flat blank. The receptacle 27 is seen to include a relatively broad, inwardly biased resilient blade 60 that extends upwardly and inwardly and, as it nears the receptacle opening, flares outwardly as shown at 61. Opposite the broad blade 60 are two flat spring contacts, 63, 64, of similar shape and also inwardly biased but free to move individually and independently of one another. These spring blade contacts are supported from the broad contact 60 by the narrow connecting members 66 extending at angles between each of the contacts 63, 64, and the blade 60. Preferably, the terminal receptacle 27 of FIG. 6 is formed from a single blank, originally flat, by bending the connecting members 66, at right angles to the flat blank, thereby simultaneously forming the larger blade 60 and the connecting members 66, and then by again bending the already bent section to 90° to form the two opposed independent blades 63, 64. Preferably, the metal used for the socket has sufficient resilience to permit limited deflection of the contact 60, 63, 64 without exceeding the fatigue resistance of the connecting members upon repeated limited deflection.

Figure 7A:
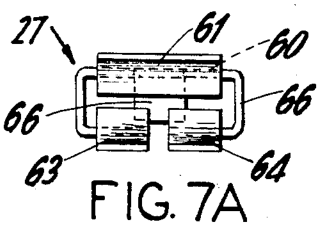
FIGS. 7A–7C are plan views of the terminal of FIG. 6, showing the elements thereof in various positions.
Figure 7B:
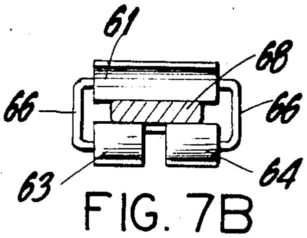
Figure 7C:
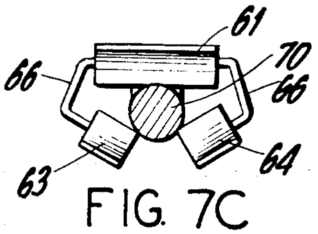

FIGS. 7A–7C illustrate the relative positions of the elements of the receptacle 27 under various conditions. FIG. 7A shows of the receptacle 27 in plan, with its elements in their natural, rest, position, i.e., without any deflection of the contacts. FIG. 7B shows the relative positions of the contacts when receiving a pin of rectangular cross-section. It is noted that the contacts 63 and 64 remain generally parallel to the broader blade contact 60, most of the deflection occurring in a direction normal to the planes of the blades. FIG. 7C illustrates the relative positions of the elements when deflected due to the insertion of a round pin 70. It may be observed that the connecting elements 66 are deflected to change their angularity with respect to the blade 60, describing a rotary movement about an axis parallel to the longitudinal axis of the socket. At the same time the elements 63 and 64 may deflect outwardly in the same manner as shown in FIG. 7B to accommodate larger size pins. In this connection, the channels or apertures in the housing 22 are made dimensionally larger than the receptacles 27 to accommodate deflections of the receptacle contacts.

From the foregoing, it can be appreciated that the terminal provides a versatile receptacle 27 that may be made to accommodate elongated connection elements of various cross-sectional shapes. The design and flexibility of the three contacts ensures that the connecting elements inserted into the receptacle will be held firmly and located generally centrally therein.

FIG. 8 shows a modification of the terminal, having a generally flat terminal post 70, but formed with an offset projection 72 comprised of parallel flat section 73 and angled offset portions 74. The dimensions of the offsets 74 is such that the post assumes a generally rectangular outside cross-section at its point of lateral support in the base channels 24, with the projection 72 giving a bearing surface for the point of contact between the post and base.

The precise relationship of the terminals 26 to the channels 24 and 36 is the base and the upper housing, respectively, is clearly illustrated in FIG. 5. As can be seen, the lower edges of the socket 27 of the terminal, being substantially larger than the channels 24, rest directly upon the upper surface of the base 20. The connecting members 66 of the terminal receptacle also form shoulders which cooperate with an undercut portion 36a of the channels to prevent upward movement of the terminals 26. Of course, the terminals can also be given a restricted upward movement, if desired, by shaping the receptacles so that they are free to slide upwardly until they abut the top end of the channel 36. It is important to observe that the terminal posts 17 are supported closely by the channels 24 in the base, with the receptacles 27 being closely surrounded by the interior surfaces of the channels 36. This offers maximum support for the terminals, while at the same time permitting easy removal upon separation of the upper housing and base.

In many of the prior art devices, the receptacle or socket portion of the terminal is inserted into a single housing unit from the top, with small barbs digging into material adjacent the base apertures to support the terminals. This support, however, is so limited that the ends of the posts can deviate substantially from their normal spacing, hampering insertion of the socket posts into the uniformly spaced holes of the printed circuit board. This disadvantage is avoided with the present invention by giving lateral support to the receptacles and posts of the terminal. In other respects, the invention is vastly improved over prior art devices also. In one prior art device, for example, a removable cover is used over a socket (of the type generally just described) in order to provide a smaller tapered opening to the terminal receptacles. In the present invention, the restricted openings are contained in the upper housing which also functions to support the receptacles firmly within the socket housing.

It should thus be appreciated that the invention offers many new advantages. It employs a superior receptacle, capable of adapting to a variety of integrated circuit pin connections, provides maximum ease of removability of conductive terminals, provides restricted access to the receptacles and maximum support to the terminals to maintain uniform spacing. all these features existing in a single socket assembly that is dimensionally smaller than many of the prior art sockets not providing removable contact terminals.

Although the invention has been described with reference to preferred and specific embodiments, numerous modifications and variations, both in form and detail, might occur to those skilled in the art. For example, the invention applies to sockets having one or more contacts, as well as to sockets of various contact arrangements and geometries. Accordingly, all such modifications and variations are intended to be included within the scope and spirit of the appended claims.

What is claimed is:

1. A socket assembly for receiving electronic components and providing terminal connections thereto, comprising:

a base having at least one elongated channel extending therethrough;

a terminal comprised of: (1) a terminal post received within the channel and protruding from the underside of the cross-section of the post corresponding to the cross-section of the channel so as to establish a close fit between said post and the channel along the entire length of the channel for achieving maximum support of the terminal; and (2) an integral receptacle extending at least partially from the upper surface of the base, said receptacle having at least three contacts, two of said contacts being in opposed relation relative to the third and each of said contacts being integral with and cantilevered from a substantially closed rectangular connecting member, said connecting member extending laterally beyond said contacts to form shoulder portions, said terminal being removable as a unit by withdrawing the terminal from the channel; and an upper housing mating with said base and having at least one channel extending therethrough for supportably receiving the receptacle of the terminal, said channel terminating at the upper surface of the housing in a contact-receiving opening aligned with the receptacle, said channel having an enlarged transverse dimension at a lower portion thereof forming a transversely extending internal shoulder which cooperates with the shoulder portions of said integral receptacle to restrict upward axial movement of the terminal.

2. A socket assembly according to claim 1, in which: the opening in the upper surface of the housing is of smaller transverse dimensions than the channel therein and the portion of said upper surface immediately surrounding the opening is downwardly and inwardly tapered to form surfaces for guiding the component into the receptacle of the terminal.

3. A socket assembly according to claim 1, in which:

the base includes upstanding deflectable arms having projections therefrom; and the upper housing has bearing surfaces providing upper surfaces for engagement by the projections to secure the housing in place.

4. A socket assembly as defined in claim 3, in which:

the arms extend upwardly from opposite ends of the base and are laterally resilient.

5. A socket assembly as set forth in claim 3, wherein:

the housing includes at least one central recess in the undersurface thereof adjacent the upper surface of the base, said bearing surfaces being adjacent said recess and said arms being received within said recess.

6. A socket assembly according to claim 5, wherein: the arms are resilient and the housing has a surface portion tapering inwardly and upwardly from the undersurface toward the recess for engagement by said arms to guide and resiliently deflect said arms into the recess when the housing is placed over the base to be mated thereto.

7. A socket assembly according to claim 1, wherein: the two contacts of the terminal are support for rotatable deflection about an axis generally parallel to the axis of the receptacle.

8. A socket assembly according to claim 1, further comprising:

means for releasably securing the upper housing to the base.

9. A socket assembly for receiving the contacts of electronic components and the like and providing connections thereto, comprising:

a base having a plurality of spaced, elongated channels extending therethrough;

terminals disposed respectively in the channels and each having: (1) a terminal post extending from the underside of the base to provide a connection external to the assembly, the cross-section of said terminal post corresponding to the cross-section of the respective channel to establish a close fit between the post and the channel along the entire length of said channel for achieving maximum support of the terminal; and (2) an integral receptacle extending at least partially from the upper surface of the base, each receptacle having at least three contacts, two of said contacts being in opposed relation relative to the third and each of said contacts being integral with and cantilevered from a substantially closed rectangular connecting member, said connecting member extending laterally beyond said contacts to form shoulder portions, each of said terminals being removable as a unit by withdrawing them from the channels; and an upper housing releasibly mating with said base and having apertures extending therethrough for receiving the portions of the receptacles extending upwardly from the base and providing close lateral support therefor, each aperture having an enlarged transverse dimension at a lower portion thereof forming a transversely extending internal shoulder which cooperates with the corresponding shoulder portions of said integral receptacle to restrict upward axial movement of the terminal, said apertures opening to the upper surface of the housing to provide access to the receptacles by the contacts of the electronic component to be inserted therein.

10. A socket assembly according to claim 1 further including at least one stud extending from the lower surface of the base.

11. A socket assembly according to claim 10 wherein a pair of spaced studs are provided adjacent the opposite ends of the base.

12. A socket assembly according to claim 10 in which the studs are tapered away from the lower surface of said base.

13. A socket assembly according to claim 9 including at least one stud extending from the underside of the base.

14. A socket assembly according to claim 13 wherein a pair of spaced studs are provided adjacent the opposite ends of the base.

15. A socket assembly as in claim 13 in which the studs are tapered away from the underside of the base.

* * * * *